(12) United States Patent
Kim et al.

(10) Patent No.: US 8,100,573 B2
(45) Date of Patent: Jan. 24, 2012

(54) LIGHT-EMITTING MODULE AND DISPLAY APPARATUS HAVING THE SAME

(75) Inventors: Tae-Hoon Kim, Seoul (KR); Seoung-Bum Pyoun, Pyeongtaek-si (KR); Young-Jin Kim, Cheonan-si (KR); Yeon-Sun Na, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 414 days.

(21) Appl. No.: 12/483,406

(22) Filed: Jun. 12, 2009

(65) Prior Publication Data

US 2010/0149834 A1 Jun. 17, 2010

(51) Int. Cl.
*F21V 8/00* (2006.01)
(52) U.S. Cl. ......... 362/612; 362/613; 362/631; 362/609
(58) Field of Classification Search .................. 362/609, 362/612, 613, 621, 622, 623, 624, 627, 628, 362/631, 633, 634; 349/58, 65
See application file for complete search history.

(56) References Cited

U.S. PATENT DOCUMENTS

| | | | | |
|---|---|---|---|---|
| 7,350,955 B2* | 4/2008 | Chang et al. | ................ | 362/612 |
| 7,591,579 B2* | 9/2009 | Yeom | ................ | 362/613 |
| 7,604,389 B2* | 10/2009 | Sakai et al. | ................ | 362/612 |
| 7,959,324 B2* | 6/2011 | Hsu | ................ | 362/247 |

* cited by examiner

*Primary Examiner* — Thomas Sember
(74) *Attorney, Agent, or Firm* — F. Chau & Associates, LLC

(57) ABSTRACT

A light-emitting module includes a power transmitting substrate disposed adjacent to a light guide plate (LGP). The power transmitting substrate includes first and second substrate portions positioned substantially perpendicular to each other. The first substrate portion faces a light incident surface of the LGP. The second substrate portion extends from the first substrate portion and is substantially parallel with a counter surface of the LGP. First and second light sources respectively emit light from a top and a side thereof, and are respectively mounted on the first and second substrate portions. The first and second light sources respectively emit light to the light incident surface. A receiving container supports the light-emitting module and contains the LGP.

22 Claims, 6 Drawing Sheets

LIGHT-EMITTING MODULE AND DISPLAY APPARATUS HAVING THE SAME

PRIORITY STATEMENT

This application claims priority under 35 U.S.C. §119 to Korean Patent Application No. 2008-126065, filed on Dec. 11, 2008 in the Korean Intellectual Property Office (KIPO), the contents of which are herein incorporated herein by reference in their entirety.

BACKGROUND OF THE INVENTION

1. Technical Field

The present invention relates to a light-emitting module and, more particularly, to a light-emitting module providing light to a rear surface of a display panel and a display apparatus having the light-emitting module.

2. Discussion of the Related Art

A display apparatus may include a backlight assembly providing light to a display panel. A cold cathode fluorescent lamp (CCFL) has been used as a backlight source. A light-emitting diode (LED) having high luminance may be used instead of the CCFL in mid-sized display apparatuses due to the LED's eco-friendly characteristics, low power consumption and stable emitting characteristics despite variations in temperature.

The backlight assembly may be classified as an edge illumination type backlight assembly or a direct illumination type backlight assembly. In the edge illumination type backlight assembly, a lamp is disposed at a side of a light guide plate (LGP). In the direct illumination type backlight assembly, a plurality of lamps are disposed under the display panel.

Technology for a high-luminance LED has been developed, so that the backlight assembly may include the LED having substantially the same luminance as that of a conventional CCFL. However, known high luminance LEDs may not be substituted for the conventional CCFLs having an L-shape, a U-shape or an O-shape, which have been used as the edge illumination type backlight assemblies.

As a result, the number of the LEDs used in a single backlight assembly may be increased to achieve high luminance. However, a space for containing the LEDs adjacent to the LGP may be more restricted when manufacturing a slim and lightweight display apparatus.

SUMMARY OF THE INVENTION

Embodiments of the present invention provide a light-emitting module having high luminance without increasing a module size, and a display apparatus having the light-emitting module.

According to an example embodiment of the present invention, a light-emitting module includes a power transmitting substrate disposed adjacent to a light guide plate (LGP), a first light source and a second light source. The LGP includes a light-emitting surface, a counter surface opposite to the light-emitting surface and a light incident surface connecting the light-emitting surface and the counter surface. The power transmitting substrate includes first and second substrate portions positioned substantially perpendicular to each other to have a folded shape. The first substrate portion faces the light incident surface. The second substrate portion extends from the first substrate portion and is substantially parallel with the counter surface.

In an example embodiment, the first light source may include a first light-emitting diode (LED) emitting light toward a top thereof (i.e., a top view type). The second light source may include a second LED emitting light toward a side thereof (i.e., a side view type).

According to an example embodiment of the present invention, a display apparatus includes a display panel, an LGP, a power transmitting substrate, first and second light sources. The LGP includes a light-emitting surface, a counter surface opposite to the light-emitting surface and a light incident surface connecting the light-emitting surface and the counter surface. The power transmitting substrate is disposed adjacent to the LGP and includes first and second substrate portions positioned substantially perpendicular to each other to have a folded shape. The first substrate portion faces the light incident surface. The second substrate portion extends from the first substrate portion and is substantially parallel with the counter surface. The first light source is mounted on the first substrate portion, is a top view type and emits light to the light incident surface. The second light source is mounted on the second substrate portion, is a side view type and emits light to the light incident surface.

In an example embodiment, the power transmitting substrate may include a flexible resin layer and power lines. The power lines may be formed on the flexible resin layer and may have a single layer or double layer structure, so that the power lines provide driving power to the first and second light sources.

According to the embodiments of the present invention, a wiring area of a power transmitting substrate may be increased without increasing the width and the thickness of a display apparatus, so that restrictions due to the size of the display apparatus may be effectively avoided. In addition, the light-emitting module may be a hybrid type having top view and side view type light sources, so that the display apparatus may have high luminance. Thus, the embodiments of the present invention may be used for a light-emitting module providing light in a display apparatus having the edge illumination type backlight assembly.

BRIEF DESCRIPTION OF THE DRAWINGS

The above and other features of the present invention will become more apparent by describing in detailed example embodiments thereof with reference to the accompanying drawings, in which.

DETAILED DESCRIPTION OF EXEMPLARY EMBODIMENTS

Figure 1:
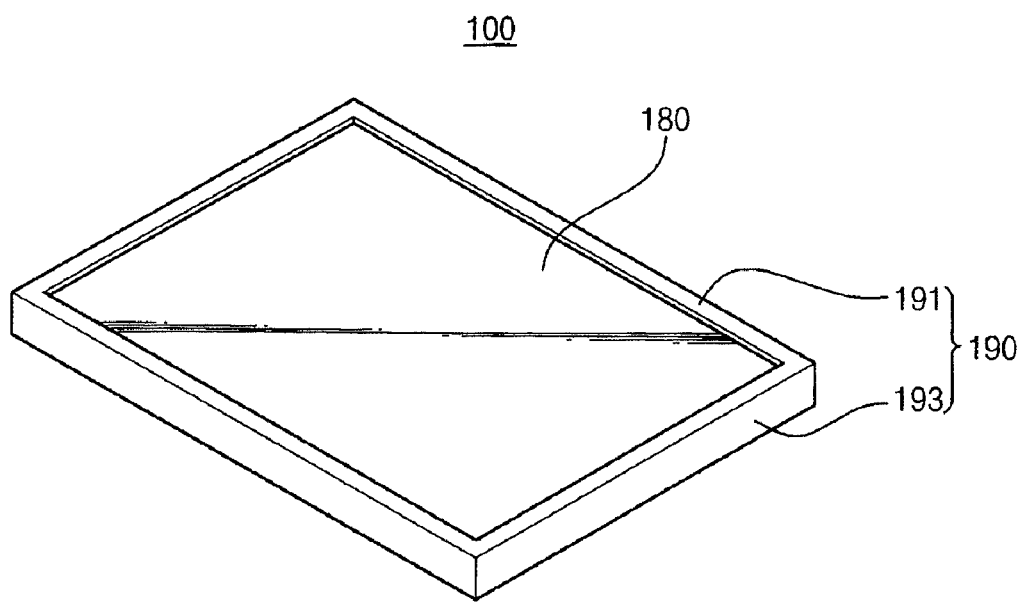
FIG. 1 is a perspective view illustrating a display apparatus according to an example embodiment of the present invention.

Although embodiments of the present invention are described more fully hereinafter with reference to the accompanying drawings, the underlying concepts may, however, be embodied in many different forms and should not be construed as limited to the exemplary embodiments set forth herein. In the drawings, the sizes and relative sizes of layers and regions may be exaggerated for sake of clarity.

It will be understood that when an element or layer is referred to as being "on," "connected to" or "coupled to" another element or layer, it can be directly on, connected or coupled to the other element or layer or intervening elements or layers may be present. Like numerals may refer to like elements throughout.

Figure 2:
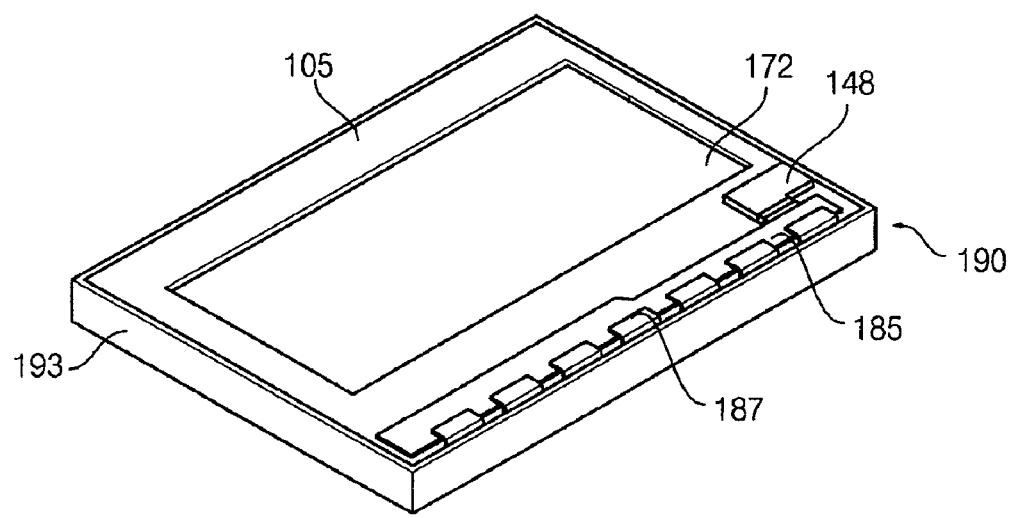
FIG. 2 is a perspective view illustrating a rear surface of the display apparatus in FIG. 1.
Figure 3:
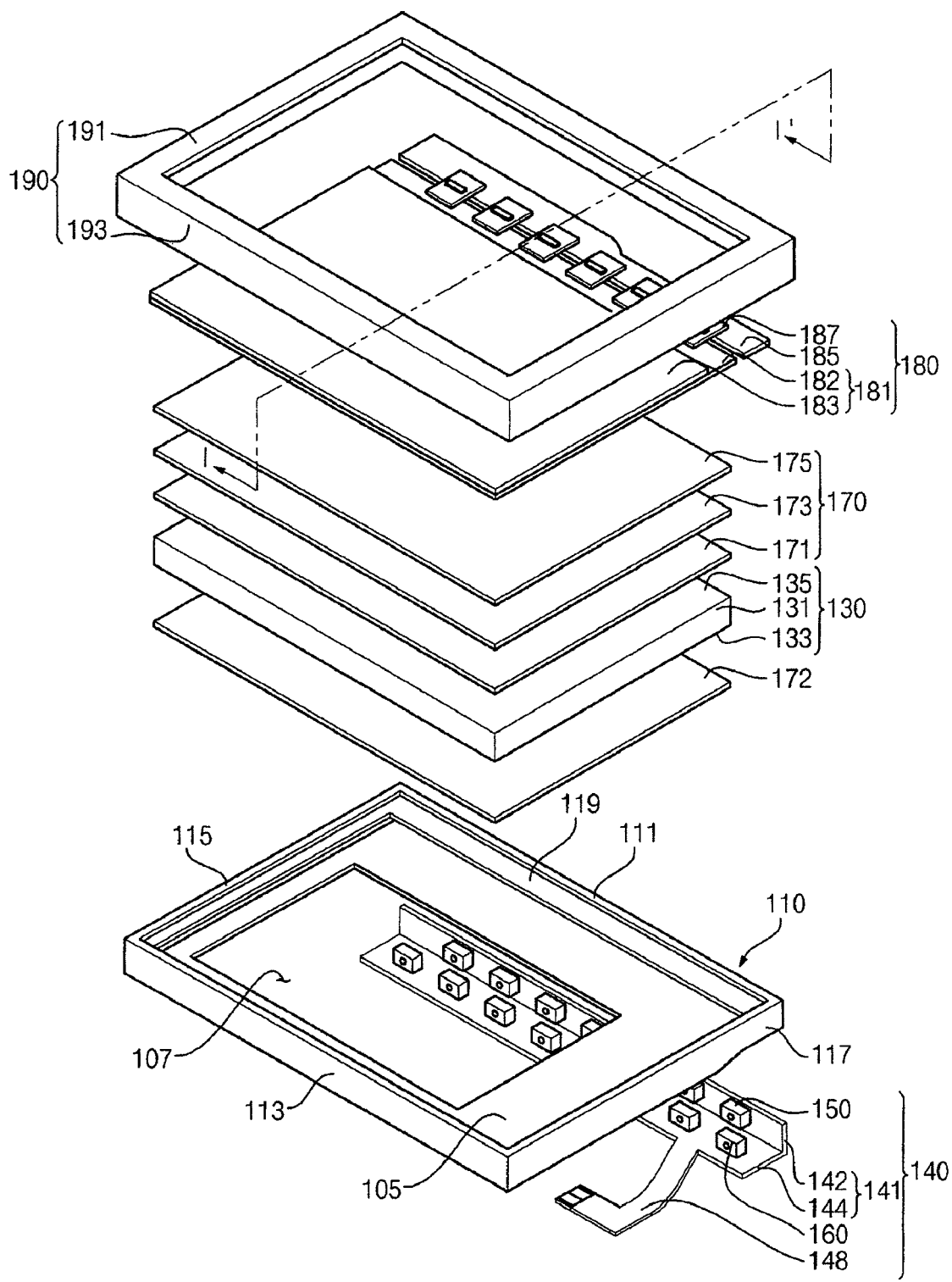
FIG. 3 is an exploded perspective view illustrating the display apparatus in FIGS. 1 and 2.

FIG. 1 is a perspective view illustrating a display apparatus 100 according to an example embodiment of the present invention. FIG. 2 is a perspective view illustrating a rear surface of the display apparatus 100 in FIG. 1. FIG. 3 is an exploded perspective view illustrating the display apparatus 100 in FIGS. 1 and 2.

Referring to FIGS. 1, 2 and 3, the display apparatus 100 according to the present example embodiment includes a receiving container 110, a light guide plate (LGP) 130, a light-emitting module 140 and a display panel assembly 180.

The receiving container 110 includes a bottom plate 105, a first side wall 111, a second side wall 113, a third side wall 115 and a fourth side wall 117. The receiving container 110 may be a molded product including, for example, a plastic material. The bottom plate 105 may have a rectangular shape. An open portion 107 is formed through the bottom plate 105. The first and second side walls 111 and 113 face each other and respectively extend from edges of the bottom plate 105 facing each other. The third and fourth side walls 115 and 117 face each other and are connected to respective ends of the first and second side walls 111 and 113. The third and fourth side walls 115 and 117 are positioned to be substantially perpendicular to the first and second side walls 111 and 113. Stepped portions 119 are respectively formed near upper surfaces of the first, second, third and fourth side walls 111, 113, 115 and 117. Each of the stepped portions 119 may include a two-stepped portion. The bottom plate 105 and the first, second, third and fourth side walls 111, 113, 115 and 117 form a receiving space.

The LGP 130 has a rectangular cube shape and guides light. The LGP 130 may include polymer, such as polymethyl methacrylate (PMMA), having high transparency, high thermal resistance, high chemical resistance and high mechanical strength.

The LGP 130 is disposed in the receiving space and is spaced apart from the first side wall 111. The LGP 130 includes a light-emitting surface 135, a counter surface 133 and a light incident surface 131. The counter surface 133 faces the bottom plate 105. The light-emitting surface 135 is positioned opposite to the counter surface 133. The light incident surface 131 faces the first side wall 111 and connects the light-emitting surface 135 with the counter surface 133. The LGP 130 has a uniform thickness. Alternatively, the LGP 130 may have a wedge shape, so that the thickness of the LGP 130 may be decreased along a direction, such as from the first side wall 111 toward the second side wall 113.

Figure 4:
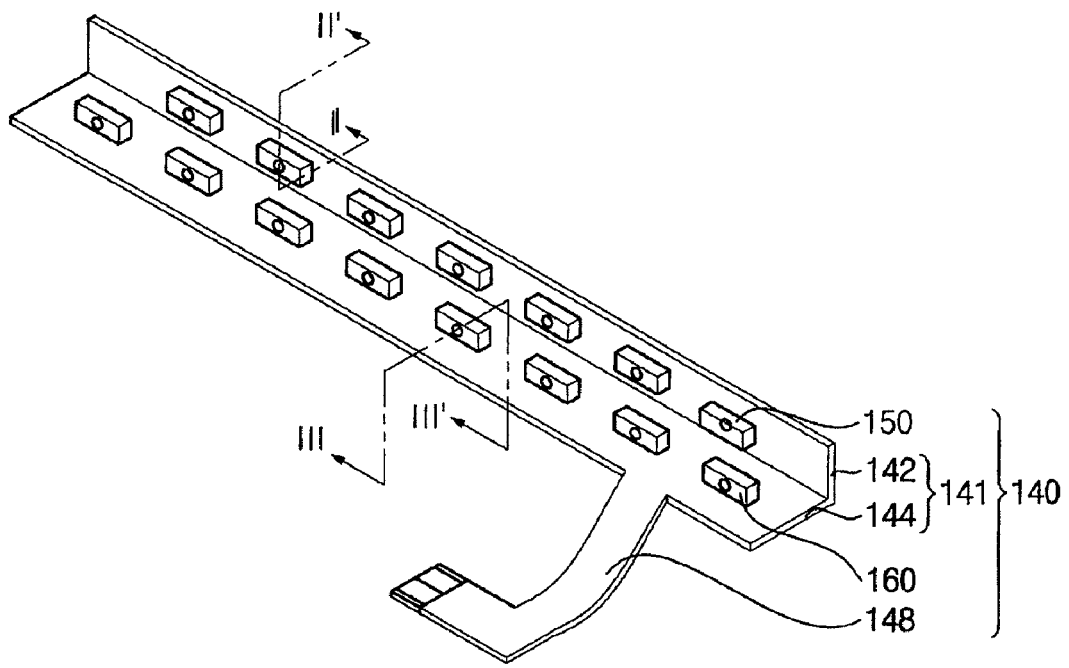
FIG. 4 is a perspective view illustrating the light-emitting module in FIG. 3.
Figure 5:
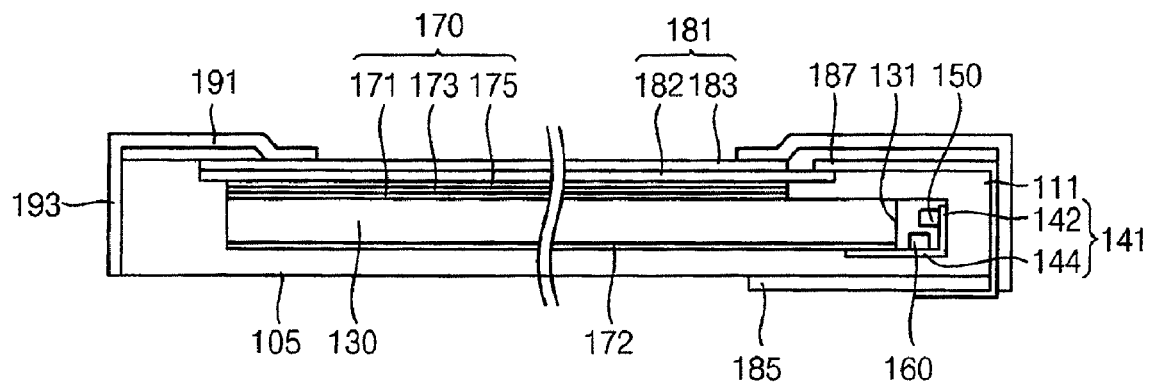
FIG. 5 is a cross-sectional view taken along a line I-I' in FIG. 3.

FIG. 4 is a perspective view illustrating the light-emitting module 140 in FIG. 3. FIG. 5 is a cross-sectional view taken along a line I-I' in FIG. 3.

Referring to FIGS. 4 and 5, the light-emitting module 140 includes a power transmitting substrate 141, a first light source 150 and a second light source 160.

The power transmitting substrate 141 includes a flexible element such as a flexible printed circuit (FPC) type. The power transmitting substrate 141 is disposed between the light incident surface 131 of the LGP 130 and the first side wall 111 of the receiving container 110. The power transmitting substrate 141 may be bent into an L-shape. A first substrate portion 142 is a first portion of the L shape and a second substrate portion 144 is a second portion of the L-shape. The first and second substrate portions 142, 144 may be flat.

The first and second substrate portions 142 and 144 may have a band shape extending along a longitudinal direction of the light incident surface 131. The first substrate portion 142 faces the light incident surface 131 and is substantially parallel with the light incident surface 131. The first substrate portion 142 is supported by the first side wall 111. The second substrate portion 144 extends from a lower end of the first substrate portion 142 to partially face the counter surface 133 of the LGP 130. Alternatively, the second substrate portion 144 may be disposed between the light incident surface 131 and the counter surface 133. The second substrate portion 144 may be substantially perpendicular to the first substrate portion 142.

Figure 6:
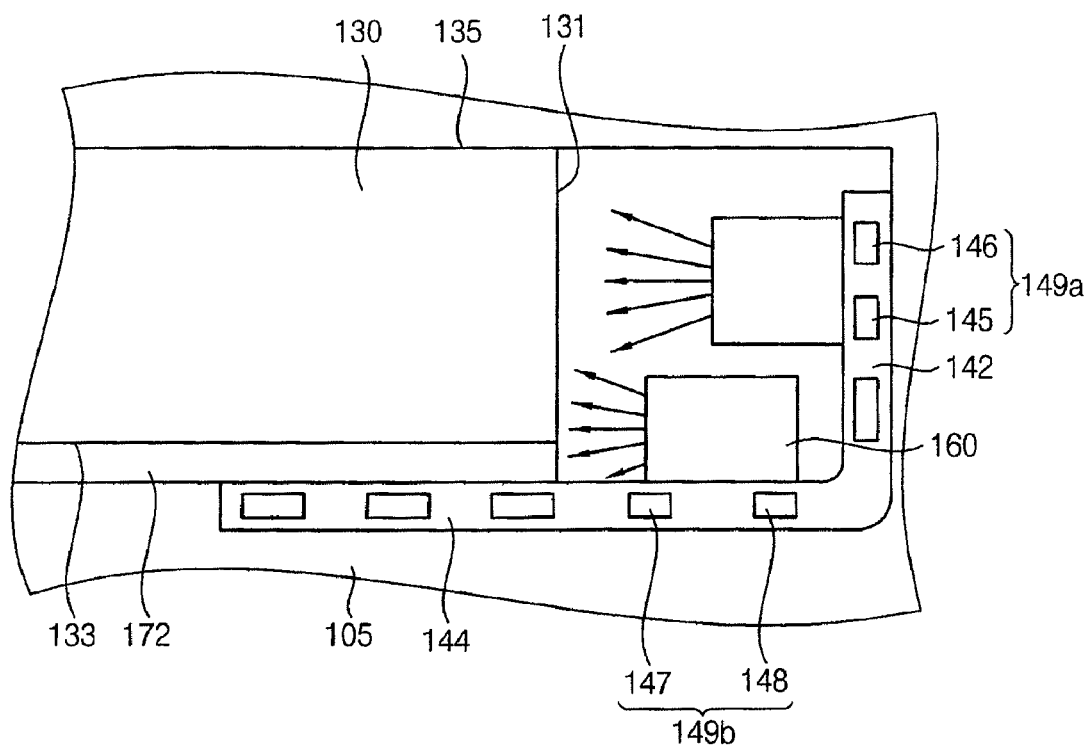
FIG. 6 is an enlarged cross-sectional view illustrating a portion of the display apparatus in FIG. 5.
Figure 7:
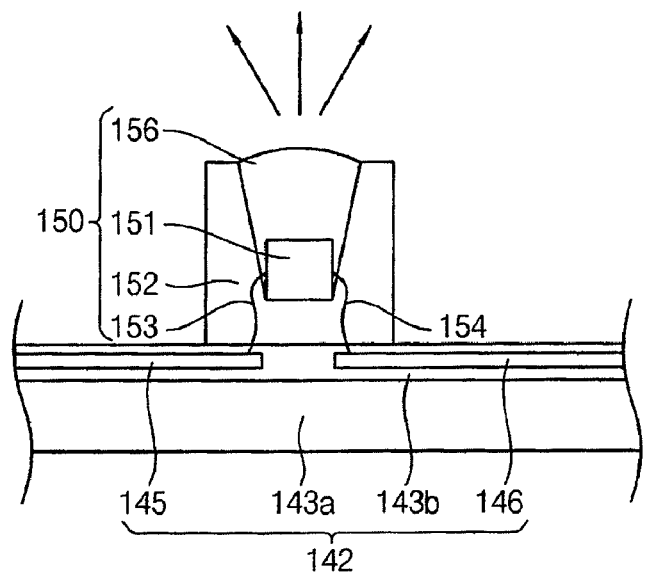
FIG. 7 is a cross-sectional view taken along a line II-II' in FIG. 4.

FIG. 6 is an enlarged cross-sectional view illustrating a portion of the display apparatus 100 in FIG. 5. FIG. 7 is a cross-sectional view taken along a line II-II' in FIG. 4.

Referring to FIGS. 4, 6 and 7, the power transmitting substrate 141 may include a flexible resin film 143a, first and second power lines 149a and 149b printed on the resin film 143a, and an insulation layer 143b.

The first and second power lines 149a and 149b are formed on a surface of the resin film 143a and respectively correspond to the first and second substrate portions 142 and 144. The insulation layer 143b covers and insulates the first and second power lines 149a and 149b. The first and second power lines 149a and 149b respectively include input lines 145 and 147 and output lines 146 and 148. The first and second power lines 149a and 149b may have various patterns depending on an arrangement pattern and a driving method of the first and second light sources 150 and 160. A light reflection layer (not shown), for example, a thin metal layer, may be formed on a surface of the insulation layer 143b.

In the present example embodiment, the input lines 145 and 147 and the output lines 146 and 148 are formed on the resin film 143a in a single layer. As mentioned above, the light-emitting module 140 includes a plurality of the first and second light sources 150 and 160, and the power transmitting substrate 141 is bent into the L-shape. Thus, the light-emitting module 140 has a wiring area sufficient to form the first and second power lines 149a and 149b, without increasing the width of the light-emitting module 140. Therefore, the wiring area is sufficient for the first and second power lines 149a and 149b to be formed in the single layer as mentioned above without forming the first and second power lines 149a and 149b in a multilayer structure. When the number of the first and second light sources 150 and 160 is increased, the first and second power lines 149a and 149b may be formed in two layers without increasing the width of the wiring area. According to the present example embodiment, the wiring area may be sufficient for the first and second power lines 149a and 149b to be formed in the single layer, so that costs for manufacturing the power transmitting substrate 141 may be decreased.

Figure 8:
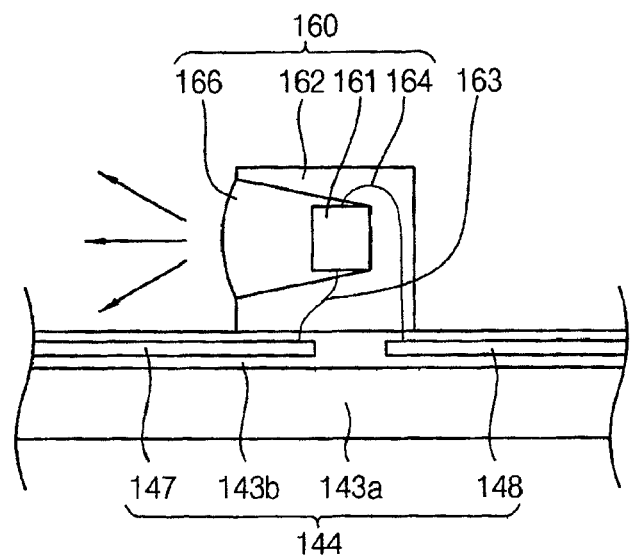
FIG. 8 is a cross-sectional view taken along a line III-III' in FIG. 4.

FIG. 8 is a cross-sectional view taken along a line III-III' in FIG. 4.

Referring to FIGS. 6, 7 and 8, the first and second light sources 150 and 160 are respectively mounted on the first and second substrate portions 142 and 144.

The first light source 150 includes a first light-emitting diode (LED) and the second light source 160 includes a second LED. The first LED is a top view type, so that the first LED emits light along a vertical direction substantially perpendicular to the first substrate portion 142. Thus, the first LED emits the light to the light incident surface 131 of the LGP 130. The second LED is a side view type, so that the second LED emits light along a horizontal direction substantially parallel with the second substrate portion 144. Thus, the second LED also emits the light to the light incident surface 131 of the LGP 130.

Accordingly, the light-emitting module 140 is a hybrid type having different types of LEDs. As mentioned above, the power transmitting substrate 141 is bent into the L-shape and two types of the LEDs are disposed, so that a plurality of the first and second light sources 150 and 160 are compactly disposed on the power transmitting substrate 141.

The first and second light sources 150 and 160 respectively include housings 152 and 162 formed as molded products, light-emitting chips 151 and 161, and protection windows 156 and 166. The light-emitting chips 151 and 161 are respectively received by the housings 152 and 162 and are electrically connected to the first and second power lines 149a and 149b through a plurality of wires 153, 154, 163 and 164. The first and second light sources 150 and 160 are disposed along a longitudinal direction of the LGP 130 at fixed intervals.

The power transmitting substrate 141 further includes a power connecting portion 148. The power connecting portion 148 extends from the second substrate portion 144 as illustrated in FIGS. 3 and 4. Alternatively, the power connecting portion 148 may extend from the first substrate portion 142. The power connecting portion 148 is drawn out of the receiving container 110 as illustrated in FIG. 2. The power connecting portion 148 may be electrically connected to a panel driving portion 185 further described below. Driving power may be applied to the first and second light sources 150 and 160 through the power connecting portion 148 via the panel driving portion 185.

Referring to FIGS. 3 and 5, the display apparatus 100 further includes a reflection sheet 172 and an optical sheet(s) 170. The reflection sheet 172 is disposed between the counter surface 133 and the bottom plate 105. When the second substrate portion 144 partially faces the counter surface 133, an end portion of the reflection sheet 172 is inserted between the counter surface 133 and the second substrate portion 144.

The optical sheet(s) 170 is disposed on the light-emitting surface 135 of the LGP 130. The optical sheet(s) 170 includes a diffusion sheet 171 and condensing sheets 173 and 175 sequentially disposed. The diffusion sheet 171 increases the luminance uniformity of the light emitted from the light-emitting surface 135. The condensing sheets 173 and 175 increase the front luminance of the light emitted from the diffusion sheet 171.

The display panel assembly 180 is disposed over the optical sheet(s) 170 and displays an image based on the light passing through the optical sheet(s) 170. The display panel assembly 180 is supported by the stepped portions 119 formed on the second, third and fourth side walls 113, 115 and 117. The display panel assembly 180 includes a display panel 181, the panel driving portion 185 and a tape carrier package (TCP) 187. The display panel includes a lower substrate 182, an upper substrate 183 and a liquid crystal layer between the lower and upper substrates 182, 183.

The lower substrate 182 is disposed on the stepped portions. The lower substrate 182 includes a plurality of gate lines, data lines and pixels. The pixel may include a switching element electrically connected to the gate and data lines, and a pixel electrode connected to the switching element.

The upper substrate 183 is combined with the lower substrate 182 and includes color filters respectively corresponding to the pixels and a common electrode facing the pixel electrode.

The liquid crystal layer is disposed between the lower substrate 182 and the upper substrate 183.

The TCP 187 electrically connects the panel driving portion 185 with a side edge of the lower substrate 182. Panel driving signals provided from the panel driving portion 185 are applied to the pixel through the TCP 187.

The panel driving portion 185 is electrically connected to the power connecting portion 148 as illustrated in FIG. 2. Thus, the driving power is applied to the power transmitting substrate 141 through the panel driving portion 185.

The display apparatus 100 further includes a top chassis 190. The top chassis 190 is combined with the receiving container 110 and exposes a display area of the upper substrate 183. The top chassis 190 includes a bezel portion 191 covering a side of the upper substrate 183 and side surface portion 193 covering the side walls of the receiving container 110.

According to the present example embodiment, the power transmitting substrate 141 is bent into the L-shape, so that the wiring area of the power transmitting substrate 141 is increased without increasing the width and the thickness of the display apparatus 100. In addition, the light-emitting module 140 is the hybrid type including the top view type and the side view type LEDs. Thus, the display apparatus 100 may be easily designed, and the light-emitting module 140 and the display apparatus 100 have high luminance.

Figure 9:
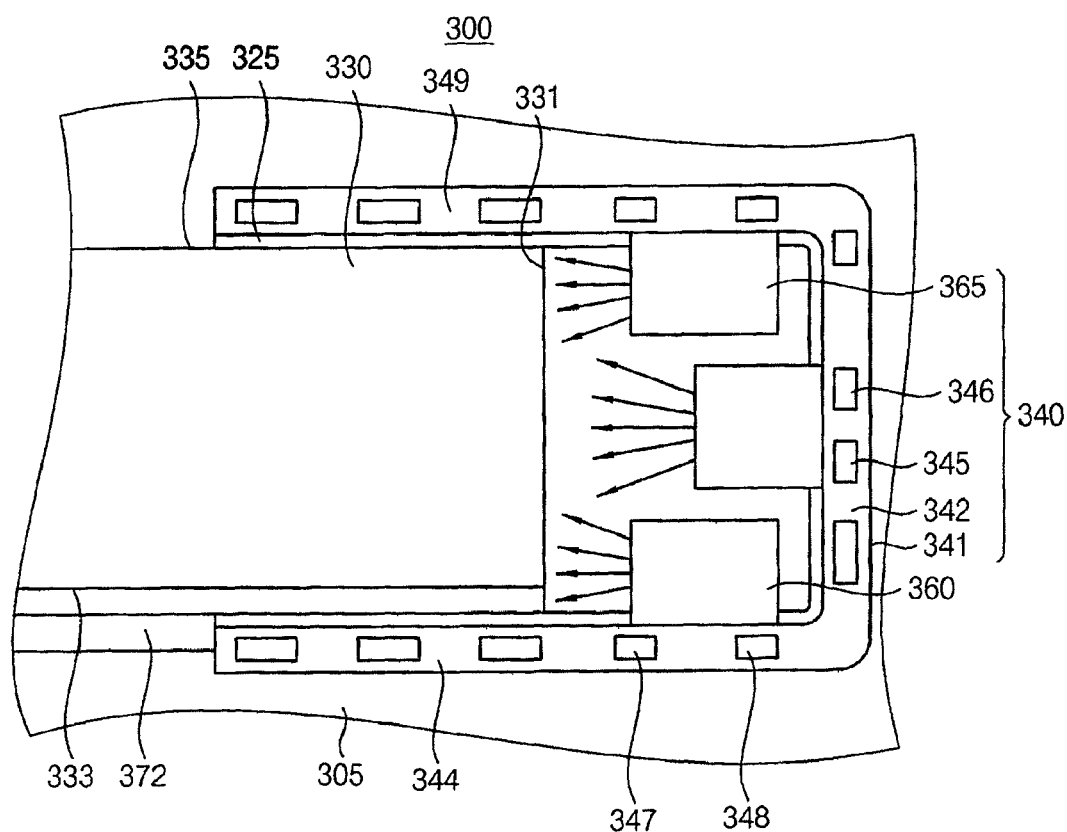
FIG. 9 is a cross-sectional view illustrating a display apparatus according to an example embodiment of the present invention.

FIG. 9 is a cross-sectional view illustrating a display apparatus 300 according to an example embodiment of the present invention.

Referring to FIG. 9, a light-emitting module 340 according to the present example embodiment is substantially the same as the light-emitting module 140 except that a power transmitting substrate 341 further includes a third substrate portion 349 and a third light source 365 mounted on the third substrate portion 349.

The power transmitting substrate 341 according to the present example embodiment further includes the third substrate portion 349. The third substrate portion faces a second substrate portion 344 and partially overlaps with a light-emitting surface 335 of an LGP 330. Thus, the power transmitting substrate 341 is bent into a U-shape.

The third light source 365 includes a third LED mounted on the third substrate portion and emitting the light to the light incident surface 331. The third LED is a side view type. The transmitting substrate 341 has the U-shape, so that first, second and third light sources may be compactly disposed on the power transmitting substrate 341 and the wiring area may be sufficient for the first, second and third light sources to be disposed on the power transmitting substrate 341.

In the present example embodiment, a light reflection layer 325 of the power transmitting substrate 341 may be a light reflection tape attached to a surface of a resin film.

A display apparatus 300 according to the present example embodiment is substantially the same as the display apparatus 100 except that the display apparatus 300 includes the light-emitting module 340.

According to the present embodiment, a plurality of the first, second and third light sources are respectively mounted on side, lower and upper surfaces of the power transmitting substrate 341 having the U-shape, so that the light-emitting module 340 and the display apparatus 300 have high luminance and the wiring area of the power transmitting substrate 341 is increased without increasing the width and the thickness of the display apparatus 300.

Figure 10:
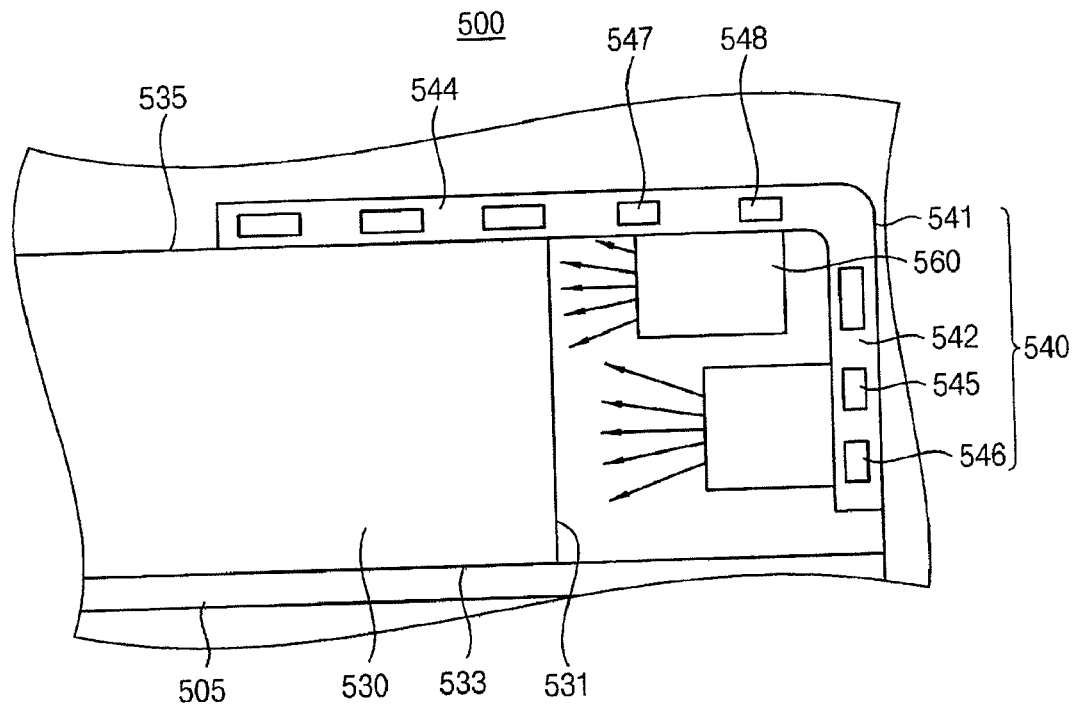
FIG. 10 is a cross-sectional view illustrating a display apparatus according to an example embodiment of the present invention.

FIG. 10 is a cross-sectional view illustrating a display apparatus 500 according to an example embodiment of the present invention.

Referring to FIG. 10, a light-emitting module 540 according to the present example embodiment is substantially the same as the light-emitting module 140 except for the position of a second substrate portion 544 of a power transmitting substrate 541.

The second substrate portion 544 according to the present example embodiment may be substantially parallel with a light-emitting surface 535 of an LGP 530 and partially overlap with the light-emitting surface 535. Thus, the power transmitting substrate 541 may be bent into an L-shape. A second light source 560 is mounted on the second substrate portion 544 and includes a side view type LED.

A display apparatus 500 according to the present example embodiment is substantially the same as the display apparatus 100 except that the display apparatus 500 includes the light-emitting module 540.

According to the present embodiment, a portion of the power transmitting substrate 541 may be disposed adjacent to the light-emitting surface 535 of the LGP 530, so that the display apparatus 500 may be easily designed, and the light-emitting module 540 and the display apparatus 500 may have high luminance. In addition, a wiring area of the power transmitting substrate 541 may be increased without increasing the width and the thickness of the display apparatus 500.

Figure 11:
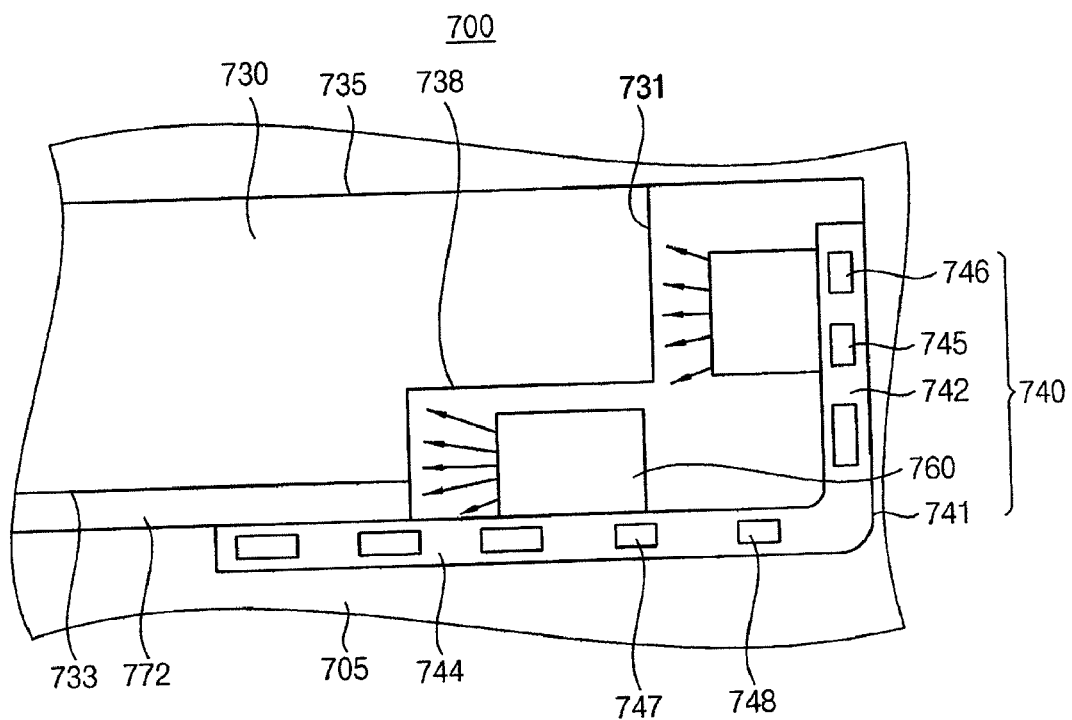
FIG. 11 is a cross-sectional view illustrating a display apparatus according to an example embodiment of the present invention.

FIG. 11 is a cross-sectional view illustrating a display apparatus 700 according to an example embodiment of the present invention.

Referring to FIG. 11, a light-emitting module 740 according to the present example embodiment is substantially the same as the light-emitting module 140, except for a configuration of the LGP 730 and positioning of the light source 760.

A display apparatus 700 according to the present example embodiment is substantially the same as the display apparatus 100 except that a stepped portion 738 is formed on an edge of the LGP 730.

The stepped portion 738 is formed on the edge between a light incident surface 731 and a counter surface 733 of an LGP 730. A second side view type light source 760 is disposed at the stepped portion 738. According to the present embodiment, a distance between a first light source 750 and the light incident surface 731 of the LGP 730 is decreased, so that the display apparatus 700 may be more compactly formed.

According to the embodiments of the present invention, a wiring area of a power transmitting substrate may be increased without increasing the width and the thickness of a display apparatus, so that restrictions due to the size of the display apparatus may be effectively avoided. In addition, the light-emitting module may be a hybrid type having top view and side view type LEDs, so that the display apparatus may have high luminance. Thus, the embodiments of the present invention may be used for a light-emitting module providing light in a display apparatus having the edge illumination type backlight assembly.

The foregoing is illustrative and is not to be construed as limiting of the teachings provided herein. Although a few example embodiments have been described, those skilled in the art will readily appreciate that many modifications are possible in the example embodiments without materially departing from the novel teachings of the present disclosure. Accordingly, all such modifications are intended to be included within the scope of the present teachings. Therefore, it is to be understood that the foregoing is illustrative and is not to be construed as limited to the specific example embodiments disclosed, and that modifications to the disclosed example embodiments, as well as other example embodiments, are intended to be included within the scope of the teachings.

What is claimed is:

1. A light-emitting module comprising:
   a power transmitting substrate disposed adjacent to a light guide plate (LGP), the power transmitting substrate including first and second substrate portions positioned substantially perpendicular to each other, the LGP including a light-emitting surface, a counter surface opposite to the light-emitting surface and a light incident surface connecting the light-emitting surface with the counter surface, wherein the first substrate portion faces the light incident surface, the second substrate portion extends from the first substrate portion and is substantially parallel with the counter surface;
   a first light source mounted on the first substrate portion and emitting light to the light incident surface; and
   a second light source mounted on the second substrate portion and emitting the light to the light incident surface.

2. The light-emitting module of claim 1, wherein the first light source includes a first light-emitting diode (LED) emitting light toward a top thereof and the second light source includes a second LED emitting light toward a side thereof.

3. The light-emitting module of claim 2, wherein the power transmitting substrate comprises:
   a flexible resin layer; and
   power lines formed on the flexible resin layer to provide driving power to the first and second light sources.

4. The light-emitting module of claim 3, wherein the power transmitting substrate further comprises a light reflection layer formed on a surface of the flexible resin layer.

5. The light emitting module of claim 3, wherein the power lines have a single layer or double layer structure.

6. The light-emitting module of claim 2, wherein the second substrate portion partially overlaps with the counter surface.

7. The light-emitting module of claim 6, further comprising a reflection sheet disposed between the counter surface and the second substrate portion.

8. The light-emitting module of claim 6, further comprising a third LED emitting light toward a side thereof,
   wherein the power transmitting substrate further comprises a third substrate portion extending from the first substrate portion to face the second substrate portion and a side of the light-emitting surface, and the third LED is mounted on the third substrate portion.

9. The light-emitting module of claim 2, wherein the second substrate portion faces the light-emitting surface.

10. The light-emitting module of claim 2, wherein the LGP includes a stepped portion formed at an edge where the light incident surface and the counter surface meet each other, and the second light source is disposed at the stepped portion.

11. The light-emitting module of claim 1, further comprising a receiving container including a bottom plate facing the counter surface and supporting the second substrate portion, and a side wall supporting the first substrate portion.

12. A display apparatus comprising:
a display panel;
a light guide plate (LGP) including a light-emitting surface facing a rear surface of the display panel, a counter surface opposite to the light-emitting surface and a light incident surface connecting the light-emitting surface with the counter surface;
a power transmitting substrate including first and second substrate portions positioned substantially perpendicular to each other, wherein the first substrate portion faces the light incident surface, and the second substrate portion extends from the first substrate portion and is substantially parallel with the counter surface;
a first light source mounted on the first substrate portion, wherein the first light source emits light toward a top thereof to the light incident surface; and
a second light source mounted on the second substrate portion, wherein the second light source emits light toward a side thereof to the light incident surface.

13. The display apparatus of claim 12, wherein the power transmitting substrate comprises:
a flexible resin layer; and
power lines formed on the flexible resin layer to provide driving power to the first and second light sources.

14. The display apparatus of claim 13, wherein the power transmitting substrate further comprises a light reflection tape attached to a surface of the flexible resin layer.

15. The display apparatus of claim 13, wherein the power lines have a single layer or a double layer structure.

16. The display apparatus of claim 13, wherein the second substrate portion partially overlaps with the counter surface.

17. The display apparatus of claim 16, further comprising a receiving container including a bottom plate facing the counter surface and supporting the second substrate portion, and a side wall supporting the first substrate portion.

18. The display apparatus of claim 17, further comprising a reflection sheet disposed between the counter surface and the bottom plate, an end portion of the reflection sheet being inserted between the counter surface and the second substrate portion.

19. The display apparatus of claim 17, wherein:
the power transmitting substrate further comprises a power connecting portion extending from the first substrate portion or the second substrate portion out of the receiving container, and
the display apparatus further comprises a panel driving portion transmitting image signals to the display panel and transmitting light source driving signals to the power connecting portion.

20. The display apparatus of claim 16, further comprising a third light source emitting light toward a side thereof,
wherein the power transmitting substrate further comprises a third substrate portion extending from the first substrate portion to face the second substrate portion and a side of the light-emitting surface, and the third light source is mounted on the third substrate portion.

21. The display apparatus of claim 13, wherein the second substrate portion faces the light-emitting surface.

22. The display apparatus of claim 13, wherein the LGP includes a stepped portion formed at an edge of the LGP where the light incident surface and the counter surface meet each other, and the second light source is disposed at the stepped portion.

* * * * *